United States Patent Office 3,234,177
Patented Feb. 8, 1966

3,234,177
STABILIZATION OF POLYMERIC MONO-OLEFINS WITH THIOALKYL PHENOLIC ETHERS
Jan van Schooten, Amsterdam, Netherlands, assignor to Shell Oil Company, New York, N.Y., a corporation of Delaware
No Drawing. Filed Dec. 14, 1961, Ser. No. 159,451
Claims priority, application Netherlands, Mar. 30, 1961, 263,103
6 Claims. (Cl. 260—45.95)

This invention relates to an improved process for the stabilization of polymeric materials. More particularly, the invention relates to an improved process for the stabilization of polymers of ethylenically unsaturated hydrocarbons.

Specifically, the invention provides a process for the stabilization of polymers of ethylenically unsaturated hydrocarbons, especially the polymers and copolymers of the monoolefins, such as, for example, ethylene, propylene, butylene and the like, particularly against thermal degradation, which comprises the addition of sulfur-containing phenolic compounds which contain at least one aromatic nuclei of which at least one hydrogen atom has been substituted by the group:

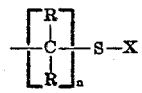

wherein X is an organic radical, and R is hydrogen and/or alkyl radicals which may be the same or different, and $n$ is an integer having a value of at least 2. The invention also provides for stabilized polymeric products.

Polymers of ethylenically unsaturated hydrocarbons generally exhibit degradation when processed or stored with resulting deterioration of properties. In order to inhibit and suppress this undesirable degradation and consequent changes in properties, certain compounds called stabilizers are added thereto.

It is known that polymers of ethylenically unsaturated hydrocarbons may be stabilized by the addition of certain monophenols of which at least two ring carbon atoms are bound to separate hydrocarbon radicals and in which at least one of these radicals is a bicyclic cyclo-aliphatic radical derived from a terpene.

Thus, polyethylene produced by Ziegler catalysts at low pressure has been stabilized by the addition of mononuclear monophenols in which one or more cyclic terpene radicals is or are substituted. The cyclic terpenes are mono-, bi- or tricyclic cycloaliphatic hydrocarbons of which the total number of carbon atoms is 10. The monocyclic terpenes consist of a cyclo-aliphatic ring of 6 carbon atoms, to which ring are bound acyclic hydrocarbon radicals having less than 4 carbon atoms. The bi- and tricyclic terpenes are distinguished from the monocyclic ones in that the cycloaliphatic ring of 6 carbon atoms contains one or two bridges which may be valency, methylene or isopropylidene bridges.

In the prior art, the phenols so substituted by terpene radicals are invariably isobornyl groups which belong to the bicyclic terpene radicals. Examples of such stabilizers are isobornyl-ortho-cresol, isobornyl-1,2,4,-xylenol, diisobornyl-para-cresol and diisobornyl-1,2,4-xylenol.

It is also known that the cresols and xylenols substituted by isobornyl groups are improved as stabilizers for polymers of olefins where used in synergistic combination with substantially involatile organic sulfides, such as, for example, dilauryl-beta-thiodipropionate, didodecyl monosulfide and didodecyl disulfide.

Another known technique for stabilizing olefinically unsaturated hydrocarbons is by adding certain sulfur-containing phenolic compounds, particularly thiobisphenols, in which the sulfur atom is attached directly to the phenyl nuclei, while in the nuclei generally at least one hydrocarbon group has been substituted at the ortho-position relative to the hydroxyl group.

It has now been found that polymer and copolymers of olefinically unsaturated hydrocarbons, and particularly the polymers and copolymers of the monoolefins which have been prepared at pressures below 100 atmospheres and using, inter alia, Ziegler catalysts, my be stabilized, particularly against thermal degradation, by new sulfur-containing phenolic compounds heretofore unknown.

It is therefore an object of the invention to provide an improved process for the stabilization of polymeric materials. It is another object of the invention to provide an improved process for the stabilization of ethylenically unsaturated hydrocarbons. It is another object to provide an improved process for the stabilization of polymers of olefins. It is a further object to provide stabilized polymeric products. It is a further object to provide polymers of ethylenically unsaturated hydrocarbons which are thermally stable. It is a further object to provide polymers of olefins which have high resistance to thermal degradation. Other objects and advantages of the invention will become apparent to one skilled in the art from the accompanying disclosure and discussion.

It has now been discovered that these and other objects may be accomplished by the process for the stabilization of polymers of ethylenically unsaturated hydrocarbons which comprises the addition of a stabilizing amount of one or more phenolic compounds containing aromatic nuclei of which one or more hydrocarbon atoms have been substituted by the group:

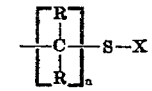

wherein X is an organic radical, R is hydrogen and/or alkyl radicals which may be of the same or different, and $n$ is an integer equal to or greater than 2, and preferably equal to or greater than 3, but generally not greater than 12.

It has also been found that this process for the stabilization of polymers of ethylenically unsaturated hydrocarbons provides polymers which are thermally stable.

The organic radical X may be, for example, an alkyl group, which may or may not be branched and preferably consists of at least 3 carbon atoms, for example, an alkyl group containing a straight chain of at least 8 and not more than 18 carbon atoms, such as n-dodecyl.

The organic radical X may also stand for an alkenyl group or for an aralkyl group that has or has not been nuclearly substituted. It may, however, also contain a chain in which hetero atoms occur, such as nitrogen, oxygen and, in particular, sulfur. The radical X may, furthermore, contain substituents, for instance one or more halogen atoms or hydroxyl groups. The atom by which the radical X is attached to the sulfur atom is generally a carbon atom; it may, however, also be another atom, for instance, a second sulfur atom. The organic radical X may further represent, inter alia, an acyl, thioacyl or mono- or dialkylthiocarbamyl group, or one of the groups:

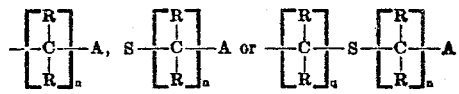

where A represents a phenolic group, $q$ stands for an integer, e.g., 2 to 6, and where the symbols $n$ and R have the meaning described above and the R's may be equal to or different from each other. The compounds in question preferably have a structure which can be represented by a symmetrical formula.

The aromatic nucleus of the phenolic compounds which are used as stabilizers according to the invention contains, besides the hydroxyl group, preferably one or more hydrocarbon substituents which may be equal to or different from each other. Besides or instead of the last-mentioned groups still other substituents, for instance, a second hydroxyl group and/or an alkoxy radical, may be attached to the aromatic nucleus.

Particularly suitable hydrocarbon substituents in the aromatic nucleus (nuclei) are cycloaliphatic and/or branched aliphatic radicals attached to those nuclei by a tertiary or a quaternary carbon atom. Examples of such radicals are cyclohexyl, cyclopentyl, tert-butyl, tert-amyl and diisobutyl groups.

The most active stabilizers of the category which is applied according to the invention are those in which the aromatic nuclei are phenyl nuclei, while the substituents attached to these nuclei occupy one or both ortho-positions and/or the para-position relative to the hydroxyl group.

If the phenolic compound contains more than one group of the type

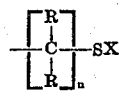

these groups may be equal to or different from each other.

The radicals R in the phenolic compounds as a rule contain not more than three carbon atoms and preferably represent hydrogen and/or methyl groups.

Besides or instead of phenyl nuclei the stabilizers may also contain other aromatic nuclei, e.g., naphthalene, phenanthrene, anthracene nuclei, as well as heterocyclic nuclei of an aromatic character, such as pyridine, quinoline, acridine, pyrimidine, furan, thiophene and benzothiazole nuclei.

Examples of the new compounds which may be particularly considered for application as stabilizers according to the invention are, e.g., the ortho- and/or para-4-thiaalkyl phenols, such as 2(4-thiahexadecyl)phenol, 2,6-bis-(4-thiahexadecyl)phenol, 2,4,6-tris(4-thiahexadecyl) phenol and alkyl derivatives of these, particularly norbornyl, isobornyl, cyclohexyl, cyclopentyl and tert-butyl derivatives, such as 4-tert-butyl-2-(4-thiahexadecyl)phenol, 4-tert-butyl - 2,6 - bis(4 - thiahexadecyl)phenyl, 4,6 - dinorbornyl-2-(4-thiahexadecyl)phenol and 1,12-bis(3,5-dinorbornyl-2-hydroxyphenyl)4,9-dithiadodecane.

These new and useful stabilizers may be prepared in the manner disclosed and described in the copending patent application by Van den Brink and Van Schooten, Serial No. 159,455, filed December 14, 1961.

By this method of preparation a compound of the general type Q—SH, in which Q stands for hydrogen or an organic radical, is made to react with a phenol, in which one or more hydrogen atoms of the aromatic nucleus have been substituted by the group:

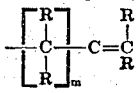

where the substituents R represent hydrogen atoms and/or alkyl groups, and $m$ is equal to zero or an integer, and the product obtained is, if desired, subjected to a consecutive reaction.

The novel sulfur-containing phenolic compounds of the present invention having the following structure are particularly preferred:

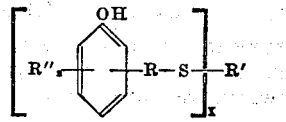

wherein R is an alkylene radical which may be straight or branched, R' is an alkyl or aralkyl or alkylene radical of, preferably, from 8 to 18 carbon atoms, R" represents cycloaliphatic and/or branched aliphatic radicals, such as norbornyl, isobornyl, cyclohexyl, cyclopentyl and tertiary butyl radicals, $z$ is an integer of from 1 to 4 and $x$ is an integer of from 1 to 3, and preferably either 1 or 2. When $x=1$, R' is an alkyl radical and when $x=2$, R' is an alkylene radical. Also preferred are those compounds of the above structure wherein the substituents R" and R are located at one or both ortho positions and/or the para-position relative to the hydroxyl group on the phenyl nuclei.

The effect of the stabilizers in question considerably increases with the concentration.

In general, the stabilizing action can also be increased by applying, together with the said phenols, one or more other stabilizers, for instance, other phenolic antioxidants and/or other organic sulfides, particularly one or more non-phenolic organic sulfides of the type $R_1$—$S_x$—$R_2$, where $x$ is equal to an integer and $R_1$ and $R_2$ represent equal or unequal radicals which contain C atoms attached to $S_x$; as a rule synergistic effects then occur.

As organic non-phenolic sulfides especially those compounds are suitable in which at least one and preferably both of the carbon atoms attached to sulfur are aliphatic ones and are themselves also attached to an aliphatic carbon atom. Particularly suited are the sulfides of the type $R_1$—$CH_2$—$CH_2$—$S_x$—$R_2$ or $$R_1\text{—}CH_2\text{—}CH_2\text{—}S_x\text{—}CH_2\text{—}CH_2\text{—}R_2$$

where $x$ is again equal to an integer and $R_1$ and $R_2$ stand for the same or different aliphatic or aromatic radicals, e.g., the beta-thioethers of propionic esters, as well as the higher dialkylmono-di- and -polysulfides, e.g., n-dodecyl-cetyl sulfide, didodecyl disulfide, dicetyl monosulfide and dicetyl disulfide.

Also, thiuram disulfide and, in particular, its tetraalkyl derivatives are suitable as non-phenolic sulfur-containing stabilizer components.

Polymeric products of the type represented by the polyalkoxyalkyl sulfides (—$R_1$—O—$R_1$—S—)$_x$, polyalkoxyalkoxyalkyl sulfides (—$R_1$—O—$R_2$—O—$R_1$—S)$_x$ or polyhydroxyalkyl sulfides (—$R_1$(OH)—S—)$_x$, as described in detail in the German "Auslegeschrift" 1,048,-022, are also suited for application together with the phenols according to the invention. Such a polymeric product can be obtained, e.g., by reacting an unsaturated ether, e.g., diallyl ether, with hydrogen sulfide.

The phenolic stabilizers are employed in a stabilizing amount and preferably from about 0.001% to 5% by weight based on the polymer to be stabilized, and most preferably from about 0.001% to 1%. Likewise, the amount of the organic sulfide stabilizer is employed in a stabilizing amount, and preferably between 0.001% to 5% by weight.

The addition of the stabilizers may be accomplished in various known ways, for example, the stabilizers may be milled into the polymers by the use of heated roll mills or on a Banbury mill. In general, the temperatures used during milling are dependent upon the particular polymer being stabilized.

The temperatures usually employed are from about 140° C. to 200° C. and preferably from about 150° C. to 190° C. The stabilizers may also be added to the final washed polymer slurry prior to drying or they may be added to the powder (fluff) prior to extrusion into nibs. The temperatures employed during the extrusion may be slightly higher than the temperatures employed during milling. The stabilizers can be added during the first stages of work-up, and it is preferable to add at least one or more stabilizers at the earliest possible stage.

If the polymer is separated from the organic diluent used during the polymerization by steam stripping, one or more stabilizers may be added simultaneously with the steam or immediately prior thereto. In certain cases it may be advantageous to use only the most stable stabilizer(s) during the steam treatment and to add the less stable component(s) to the final polymer. If desired, a quantity of one or more stabilizers may be added subsequent to the steam stripping of the final polymer.

For comparison the table also gives data on experiments in which use was made of two stabilizers (Nos. 8 and 9) containing less than two carbon atoms between the sulfur atoms and the aryl nuclei.

*Table 1*

| No. | Stabilizer Designation | Mol. Weight | Induction period, min., at a stabilizer concentration, percent W. of— | | | | | | |
|---|---|---|---|---|---|---|---|---|---|
| | | | 0.03 | 0.05 | 0.1 | 0.15 | 0.30 | 0.4 | 0.5 |
| 1 | 2-(4-thiahexadecyl) phenol | 336 | 28 | 77 | 340 | 810 | 2,900 | 4,700 | 6,000 |
| 2 | 2-(4-thiahexadecyl)-4-norbornylphenol | 430 | 84 | 106 | 340 | 770 | 1,650 | 2,000 | |
| 3 | 4,6-dinorbornyl-2-(4-thiahexadecyl) phenol | 524 | 65 | 88 | 210 | 3,000 | 7,080 | 8,150 | 8,900 |
| 4 | 4-tert-butyl-2-(4-thiahexadecyl) phenol | 392 | 194 | 365 | 1,050 | 2,050 | 4,400 | 5,500 | |
| 5 | 2,6-bis(4-thiahexadecyl)-phenol | 578 | 93 | 155 | 350 | 680 | 1,850 | 2,550 | 3,100 |
| 6 | 4-tert-butyl-2,6-bis(4-thiahexadecyl) phenol | 634 | 121 | 208 | 650 | 1,350 | 3,250 | 3,900 | 4,400 |
| 7 | 1,12-bis(3,5-dinorbornyl-2-hydroxyphenyl)-4,9-dithiadodecane | 766 | 165 | 280 | 1,750 | 3,950 | 7,600 | 8,700 | |
| 8 | 4,4'-thio-bis(2-tert-butyl-5-methyl) phenol | 358 | | | 350 | 730 | 1,270 | 1,580 | 1,900 |
| 9 | 2,2'-dihydroxy-3,3',5,5'-tetranorbornyldibenzyl sulfide | 622 | | | | 720 | 1,300 | 1,700 | 2,100 |

Advantages of the invention are illustrated by the following examples. The reactants and their proportions, and other specific ingredients of the recipes are presented as being typical and various modifications can be made in view of the foregoing disclosure and discussion, without departing from the spirit or scope of the disclosure or of the claims. Unless otherwise specified, parts and percentages disclosed in the examples are by weight.

EXAMPLE I

This example illustrates the improvement of the new and useful phenolic thermal stabilizers over the prior art phenolic stabilizers.

EXAMPLE II

Stabilization tests were carried out on the polymer described in Example I; as stabilizers were used the same compounds as those mentioned in Table I of Example I (stabilizer A), either alone or together with dicetyl sulfide or 2,4,6-trinorbornylphenol. The stabilizer concentrations applied and the results, expressed as the duration in minutes of the induction period (I.P.) are indicated in Table II. Stabilizer numbers refer to the numbers and corresponding designations in Table I. Also included in Table II for comparison are the results obtained on addition of dicetyl sulfide only or of 2,4,6-trinorbornylphenol only.

*Table II*

| | I | | II | | III | | IV | |
|---|---|---|---|---|---|---|---|---|
| | Concentration of Stabilizer A | | | | Nature and Concentration of Stabilizer A as in Column I | | | |
| Stabilizer A | 0.25 mmole per 100 g. | | 0.50 mmole per 100 g. | | Also added 0.21 mmole dicetyl sulfide per 100 g. | | Also added 0.25 mmole 2,4,6-trinorbornylphenol per 100 g. | |
| | I.P., min. | Stab. Conc., Percent W. | I.P., min. | Stab. Conc., Percent W. | I.P., min. | Total Stab. Conc., Percent W. | I.P., min. | Total Stab. Conc., Percent W. |
| 1 | 230 | 0.084 | 900 | 0.168 | 406 | 0.184 | 1,933 | 0.178 |
| 2 | 390 | 0.108 | 1,230 | 0.216 | 633 | 0.208 | 987 | 0.202 |
| 3 | 2,190 | 0.132 | 6,250 | 0.264 | 3,430 | 0.232 | 2,438 | 0.225 |
| 4 | 1,000 | 0.098 | 2,900 | 0.196 | 1,176 | 0.198 | 1,794 | 0.192 |
| 5 | 640 | 0.145 | 1,770 | 0.290 | 685 | 0.245 | 3,363 | 0.239 |
| 6 | 1,440 | 0.158 | 3,390 | 0.317 | 1,495 | 0.258 | 2,310 | 0.253 |
| 7 | 1,680 | 0.096 | 5,650 | 0.192 | 3,150 | 0.196 | 1,866 | 0.190 |
| None | | 0.000 | | 0.000 | | | 250 | 0.094 |
| Do | | | | | 7 | 0.1 | | |

Polypropylene which had been prepared with the aid of a catalyst system composed of $TiCl_3$ and aluminum diethyl chloride and which possessed an intrinsic viscosity of 2.7 (at 135° C. in decahydronaphthalene), was stabilized with the compounds mentioned in Table I, in which also the concentrations, calculated on polymer, are indicated. The polymer thus stabilized was heated within a few minutes to 160° C. at atmospheric pressure in a reaction vessel filled with pure oxygen, to which an open mercury manometer was connected.

By measuring the oxygen consumption as a function of time the "induction period" was determined, i.e., the period of time passing between the moment at which heating is started and the moment at which a rapid rise in the oxygen consumption sets in.

The results of these measurements are also included in the table.

I claim as my invention:

1. A process for the stabilization of solid polymers of monoolefins which comprises adding a stabilizing amount of a phenolic compound having the structural formula:

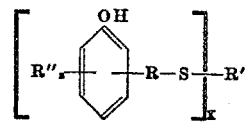

wherein R is an alkylene radical containing 3 carbon atoms, R" is selected from the group consisting of norbornyl and tertiary butyl radicals, z is an integer of from 1 to 4, x is an integer having one of the values 1 and 2 and R' is selected from the group consisting of alkyl and alkylene radicals containing from 8 to 18 carbon atoms.

2. A process for the stabilization of solid polymers of monoolefins which comprises adding to said polymers a stabilizing amount of 4,6-dinorbornyl-2-(4-thiahexadecyl) phenol.

3. A process for the stabilization of solid polymers of monoolefins which comprises adding to said polymers a stabilizing amount of 1,12-bis-(3,5-dinorbornyl-2-hydroxyphenyl)-4,9-dithiadodecane.

4. A composition comprising solid polymers of monoolefins and a stabilizing amount of a phenolic compound selected from the group consisting of 4,6-dinorbornyl-2-(4-thiahexadecyl)phenol and 1,12-bis-(3,5-dinorbornyl-2-hydroxyphenyl)-4,9-dithiadodecane.

5. A composition as in claim 4 wherein the polymer is polypropylene.

6. A stabilized composition comprising polypropylene and from 0.001 to 5% by weight of the polypropyene of each of 4,6-dinorbornyl-2-(4-thiahexadecyl)phenol and dicetyl sulfide.

References Cited by the Examiner
UNITED STATES PATENTS

| | | | |
|---|---|---|---|
| 2,668,768 | 2/1954 | Chenicek | 260—45.95 |
| 2,794,050 | 5/1957 | Thompson | 252—406 |
| 2,831,030 | 4/1958 | Chenicek | 260—45.95 |
| 2,874,192 | 2/1959 | Cottle et al. | 252—406 |
| 2,953,542 | 9/1960 | Stark et al. | 260—45.95 |
| 2,967,847 | 1/1961 | Hawkins | 260—41 |
| 2,976,324 | 3/1961 | Long et al. | 252—404 |
| 3,010,937 | 11/1961 | Roos | 260—45.95 |
| 3,065,275 | 11/1962 | Goddard | 252—406 |

LEON J. BERCOVITZ, *Primary Examiner.*

WILLIAM H. SHORT, *Examiner.*

UNITED STATES PATENT OFFICE
CERTIFICATE OF CORRECTION

Patent No. 3,234,177　　　　　　　　　　　　　　February 8, 1966

Jan van Schooten

It is hereby certified that error appears in the above numbered patent requiring correction and that the said Letters Patent should read as corrected below.

Column 7, lines 3 and 4, strike out "each of 4,6-dinorbormyl-2-(4-thiahexadecyl)phenol and dicetyl sulfide." and insert the same after "of", second occurrence, in line 2, column 8.

Signed and sealed this 31st day of January 1967.

(SEAL)
Attest:

ERNEST W. SWIDER
Attesting Officer

EDWARD J. BRENNER
Commissioner of Patents